United States Patent [19]

Trott

[11] Patent Number: 4,511,472
[45] Date of Patent: Apr. 16, 1985

[54] APPARATUS FOR CONTINUOUS POLYMER FILTRATION

[75] Inventor: Delano B. Trott, Salem, Mass.

[73] Assignee: Beringer Co., Inc., Marblehead, Mass.

[21] Appl. No.: 480,330

[22] Filed: Mar. 30, 1983

[51] Int. Cl.³ .............................................. B01D 35/12
[52] U.S. Cl. ..................................... 210/340; 425/197; 137/625.47; 251/297; 210/424; 210/456
[58] Field of Search ....................... 137/625.32, 625.22, 137/625.23, 625.47; 251/297; 210/341, 343, 117, DIG. 15, 791, 106, 136, 238, 239, 240, 248, 332, 340, 357, 416.1, 417, 418, 435, 456, 424; 425/146, 185, 186, 197, 198, 199

[56] References Cited

U.S. PATENT DOCUMENTS

| 678,532 | 7/1901 | Bachman | 210/117 |
| 997,743 | 7/1911 | Bordo | 137/625.47 |
| 1,146,804 | 7/1915 | Little | 137/625.47 |
| 1,183,012 | 5/1916 | Lewis et al. | 137/625.32 |
| 1,927,582 | 9/1933 | Denk | 210/117 |
| 2,070,395 | 2/1937 | Easter | 210/117 |
| 3,931,011 | 1/1976 | Richards et al. | 210/341 |
| 4,202,659 | 5/1980 | Kinoshita | 210/DIG. 15 |

Primary Examiner—Richard V. Fisher
Assistant Examiner—Wanda L. Millard
Attorney, Agent, or Firm—Kenway & Jenney

[57] ABSTRACT

A polymer filtration system comprises plural passages each having therein a filter selectively removable for cleaning and replacement. A single valve controls the closing off of the passages from an inlet to the filters, and check valves in each of the passages downstream of the filters prevent backflow. By adapting the system to permit simultaneous flow in plural passages between filter changes, the filters may be changed in staggered sequence at intervals chosen to attain optimum system performance.

2 Claims, 6 Drawing Figures

POSITION #1

POSITION #2

POSITION #3

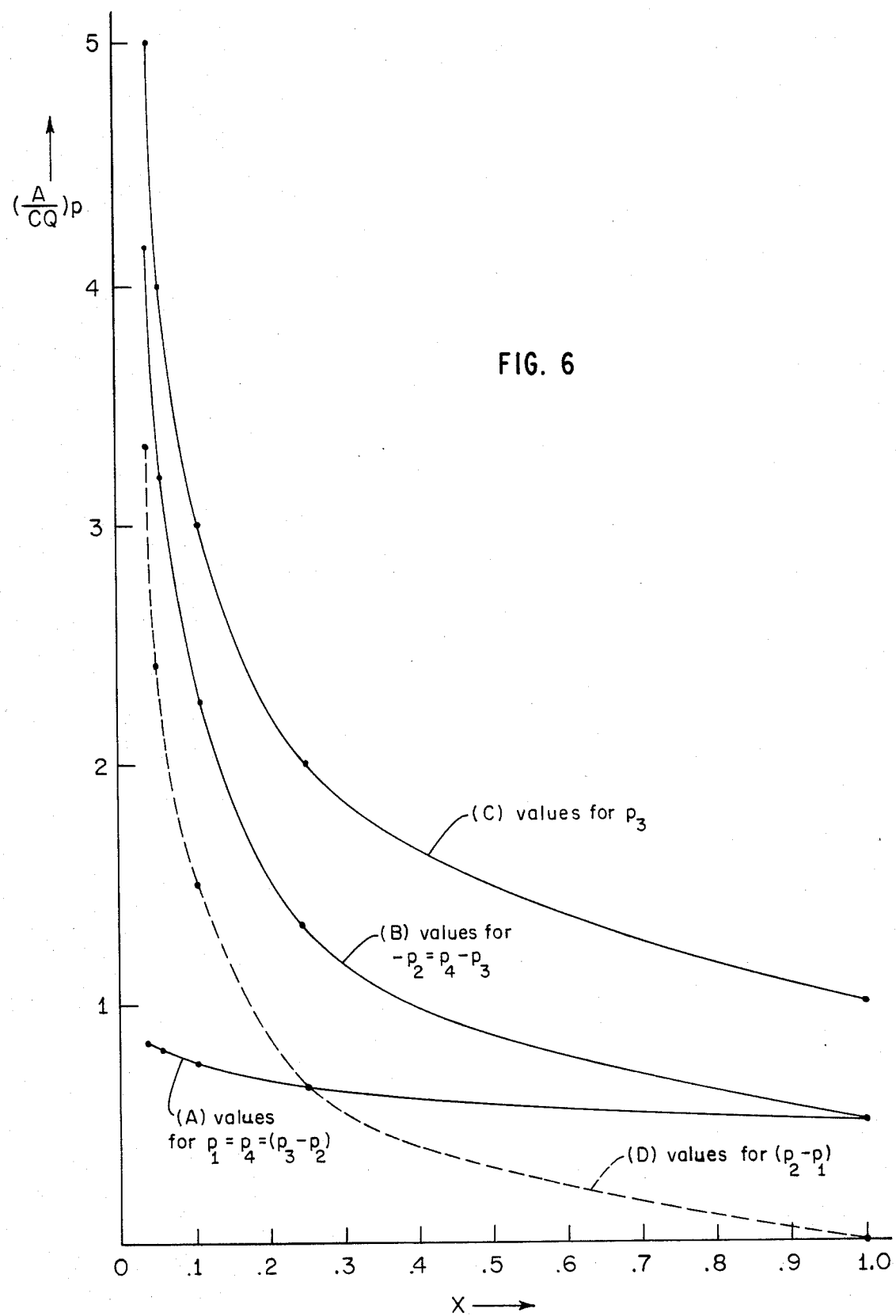

APPARATUS FOR CONTINUOUS POLYMER FILTRATION

BRIEF SUMMARY OF THE INVENTION

This invention relates generally to polymer filtration systems or so-called "screen changers," and more particularly to improvements in the performance of such systems.

Polymer filters are designed to operate under substantial pressures generated by polymer extruders. Filters are required for the removal of foreign materials, the removal or dispersion of polymer inhomogeneities such as gels, and for adding the mixing of the polymer. Generally, a compromise is required between these functions, as improving one function may reduce another. For example, increasing the filter area may improve contaminant capacity but may reduce polymer shear and therefore mixing. As a filter becomes blocked its performance changes, and generally in systems designed for substantially continuous polymer volume flow rate, the pressure drop across the filtration unit increases. In one system, for example, there is a pressure difference of 2,000 psi between the minimum pressure that exists when clean filters are put on-line and the maximum pressure just before a filter change. In some systems, further problems are experienced as a result of the sudden pressure changes that occur when a blocked filter is shut off for changing, and when a clean filter is put on-line.

Conventional slide plate screen changers are so constructed that only a single filter screen can be on-line at any time. During a change from one filter screen to the other there is a momentary interruption in the flow of polymer. This may disrupt the operation of a die which is connected to the filtration system.

A number of filtration systems have been devised in an effort to avoid the process disruption caused by a momentary interruption of polymer flow. These systems employ a variety of valve means for closing off filters, for venting a closed-off filter preparatory to its removal for cleaning and replacement, and for expelling air trapped in the flow passages as a result of opening them for removal of the filter. The latter function, stated inversely, is to pre-fill the clean filter assembly, so that air will not be introduced into the flowing polymer when the filter is brought on-line.

In some prior art systems, the valve means required for isolating each filter comprise externally actuated valve members both up-stream and down-stream of the filter in order to isolate it from the pressurized flowing polymer. In such systems the necessity for operating both up-stream and down-stream valves creates the need to interrelate the operations of the valves by means of sequencing procedures and/or mechanisms, and when the system is under substantial pressure, considerable forces are required to operate pairs of valves simultaneously.

In some systems exemplified by U.S. Pat. No. 4,167,384 issued Sept. 11, 1979 to Shirato, et al, a so-called bi-flow filter system is used. In this type of system, polymer normally flows through two filters simultaneously. Each of the filters is mounted in a slide plate assembly, which permits the filter to be withdrawn from the system while the system pressure is maintained, the flow through the other filter being uninterrupted. Such systems, however, can experience substantial increases in the pressure drop and substantial sudden pressure changes depending upon the duration of time that the filters are on-stream and the extent to which the on-stream filter is blocked when a clean screen is first put on-stream.

With a view to overcoming certain of the disadvantages of prior filtration systems, improvements have been made in plural filter systems, particularly with respect to the valving means, and methods have been devised to achieve an optimal performance of the system with respect to the parameters of pressure drop, sudden pressure change and extent of filter utilization.

By the incorporation of a check valve downstream of each filter, it has been made possible to reduce the number of operative valve elements employed for changing the filters, greatly reducing the force required for mechanically displacing the valve elements. Thus a portion of the necessary valving is accomplished by passive means operating in response to system pressure, eliminating the seals and other structures required for actuation by external means.

The achievement of optimal performance characteristics, particularly in bi-flow applications, results from staggering the sequence in which the filters are changed. By changing the filters in a sequence determined by the observed buildup in pressure values, the above-mentioned operating characteristics can be controlled and mutually adjusted. Such adjustments are facilitated by an analysis of the system variables and particularly the incremental effects of changes therein.

DESCRIPTION OF THE DRAWINGS

FIG. 6 illustrates the variations that occur in the pressure drop across the filtration system as a function of the fraction of a clean filter that remains open at the time of changing, in accordance with the below-described staggered sequential changing procedure.

DETAILED DESCRIPTION

Figure 1:
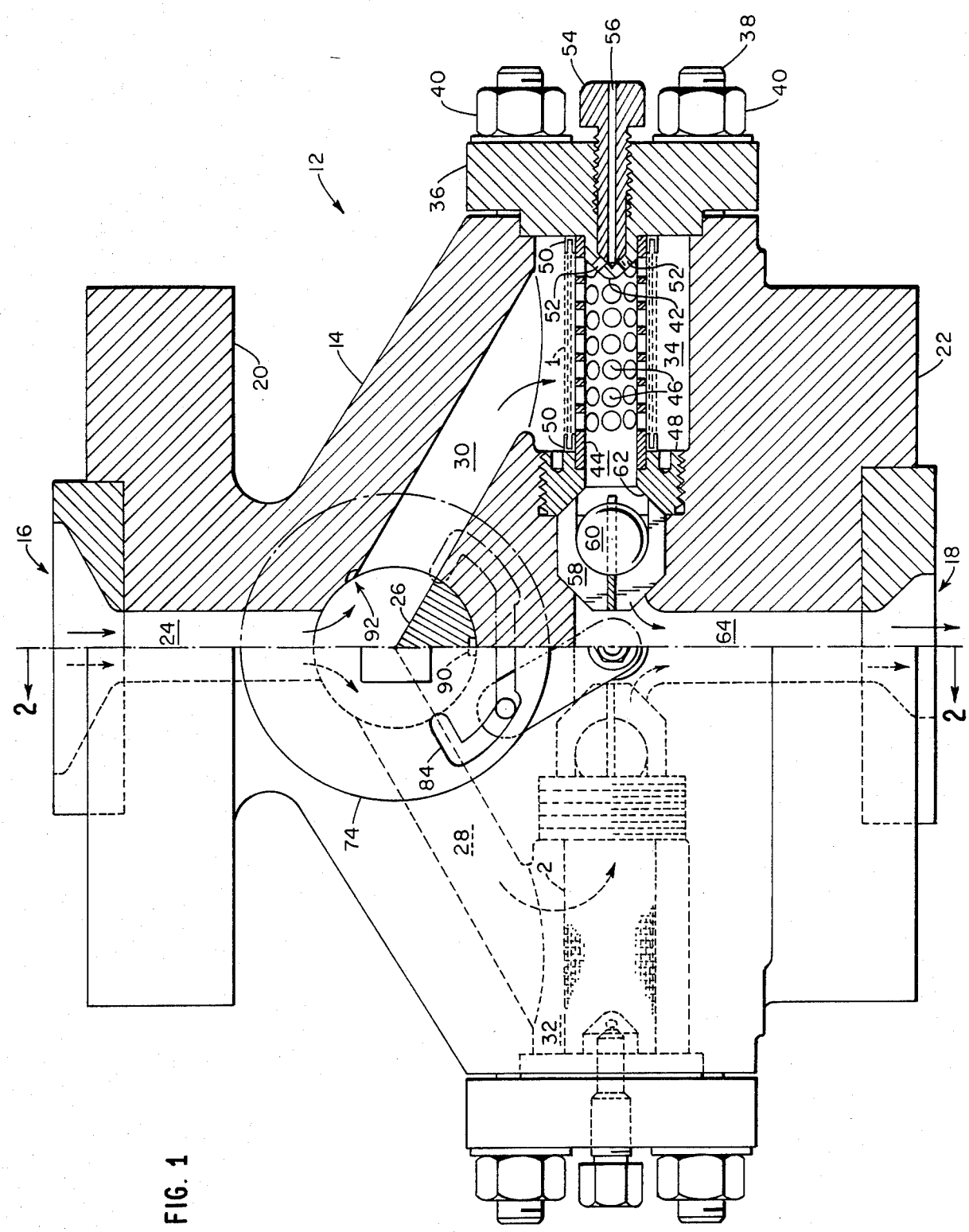
FIG. 1 is an elevation partially in section showing a polymer filtration system employing two filters and adapted for bi-flow operation in accordance with this invention.

Referring to FIG. 1, filters 1 and 2 are incorporated in a polymer filtration system designated at 12. The system is housed within a body 14 having an inlet 16 and an outlet 18. The body 14 has a flange 20 suitably adapted for mounting to the end of an extruder in a conventional manner. Likewise, the body has an end portion 22 adapted for connection with a die.

The body further has an inlet passage 24 communicating with a plug valve 26, the valve being adapted for selectively interconnecting the passage 24 with two passages 28 and 30. The latter passages respectively communicate with filter chambers 32 and 34.

The filters 1 and 2 are identically constructed, and each is mounted in a subassembly described as follows with respect to filter 1. A mounting head 36 is mounted by threaded studs 38 and nuts 40 to cover a circular aperture in the chamber 34. The head has an integral extension 42 with a cylindrical surface over which one end of a cylindrical tube 44 is fitted. The tube 44 has a number of uniformly annularly spaced perforations 46. The opposite end of the tube fits in a valve seat insert 48 threaded in the body 14. The filter 1 is preferably in the form of a cylinder of wire mesh with annular metal caps 50 at its ends, slipped over the surface of the tube 44.

The head 36 has a blind threaded central hole with a plurality of perforations 52 communicating between the interior of the tube 44 and the hole. A vent valve 54 having a central through hole 56 is threaded in the head and adapted for sealing the apertures 52 or selectively to provide communication between the interior of the tube 44 and the hole 56 for venting the chamber 34.

It will be seen that the filter 1 may be readily removed from the body 14 by removal of the nuts 40 and withdrawal of the head 36 with the tube 44 and filter 1 mounted thereon.

The body 14 is formed to receive a pair of ball retainer plates 58 each having the configuration shown in FIG. 1, the plates being mounted at right angles and formed at one end to receive a spherical ball check valve 60 and to restrain its movement so that its center is confined to translatory motion coaxially with respect to an annular seat 62 formed on the insert 48.

The filter 2 has structures identical to those described above with reference to the filter 1. The ball check valves of both filter communicate with an outlet passage 64 communicating with the outlet 18.

The plug valve 26 may be rotated counterclockwise as shown in FIG. 1 to close off the passage 30, or clockwise to close off the passage 28. In the position illustrated, the plug valve provides communication between the inlet passage 24 and both of the passages 28 and 30. The valve is rotated by means of a handle 66 secured by a screw 68 to a stem 70 on the valve.

As hereinafter described, it is preferable to change the filters in a predetermined sequence. In order to assure the proper sequence, an escapement designated generally at 72 is preferably provided. This escapement consists of a circular cam plate 74 keyed to the valve stem 70 and a link 78 pivotal at one end on a fixed pivot extension 80 threaded in the body 14, and having near the other end a pin 82 slidable in a cam slot 84 formed in the plate 74.

Figure 3:
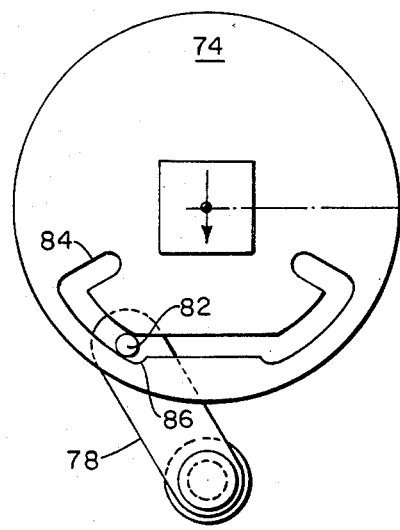
FIGS. 3 to 5 illustrate different positions of an escapement mechanism to effect an alternate sequence of operation of the valve means in the embodiment of FIGS. 1 and 2.
Figure 3:
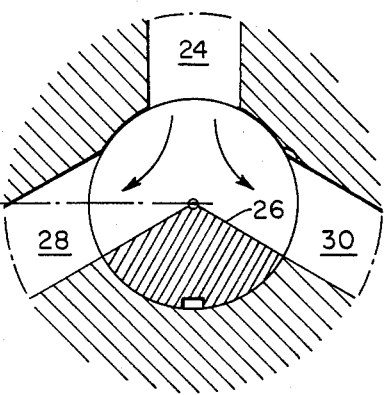
Figure 4:
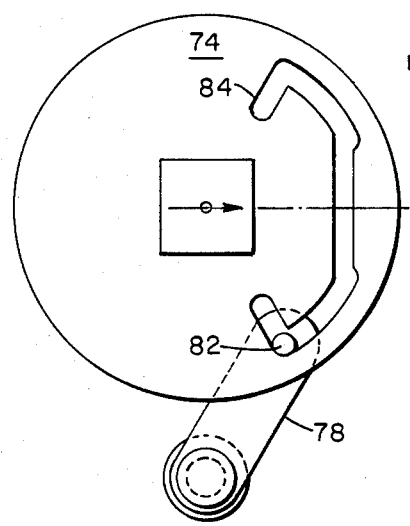
Figure 4:
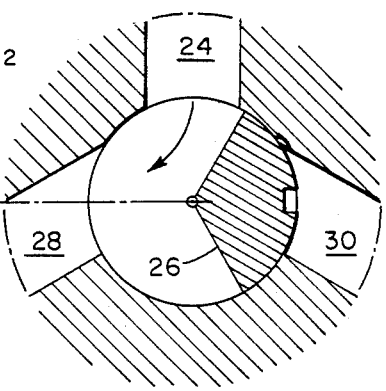
Figure 5:
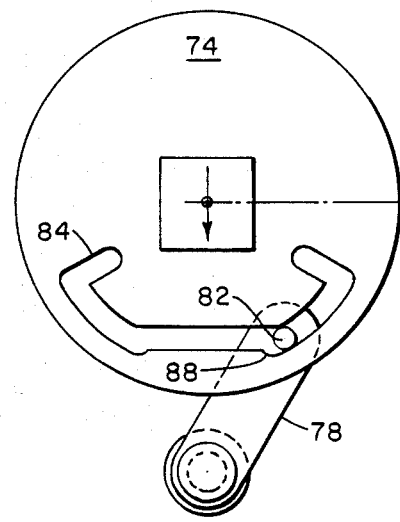
Figure 5:
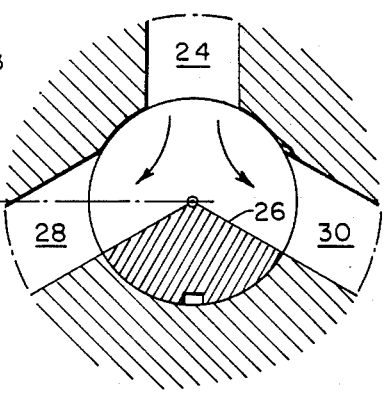

The operation of the escapement is explained with reference to FIGS. 3 to 5. In a first position shown in FIG. 3, the valve 26 opens both passages 28 and 30, and the pin 82 is located in the cam slot 84 near a detent 86 formed in the latter. It will be seen that an attempt to rotate the plate 74 in a clockwise direction will immediately result in the detent 86 engaging the pin 82 to prevent further rotation in that direction. However, the plate 74 can be rotated in a counterclockwise direction. Such rotation may continue until the plate 74 reaches the position illustrated in FIG. 4, wherein the valve 26 fully closes the passage 30. This permits the changing of the filter 1. After the filter is changed, the plate 74 may be rotated in a clockwise direction to the position shown in FIG. 5, wherein the pin 82 is adjacent a detent 88 formed in the slot 84. In this position both of the passages 28 and 30 are in communication with the inlet passage 24. With the escapement in this position, an attempt to rotate the plate 74 in a counterclockwise direction is prevented by the engagement of the detent 88 with the pin 82, thereby assuring that in the next filter change the passage 28 will be closed off and not the passage 30.

Figure 2:
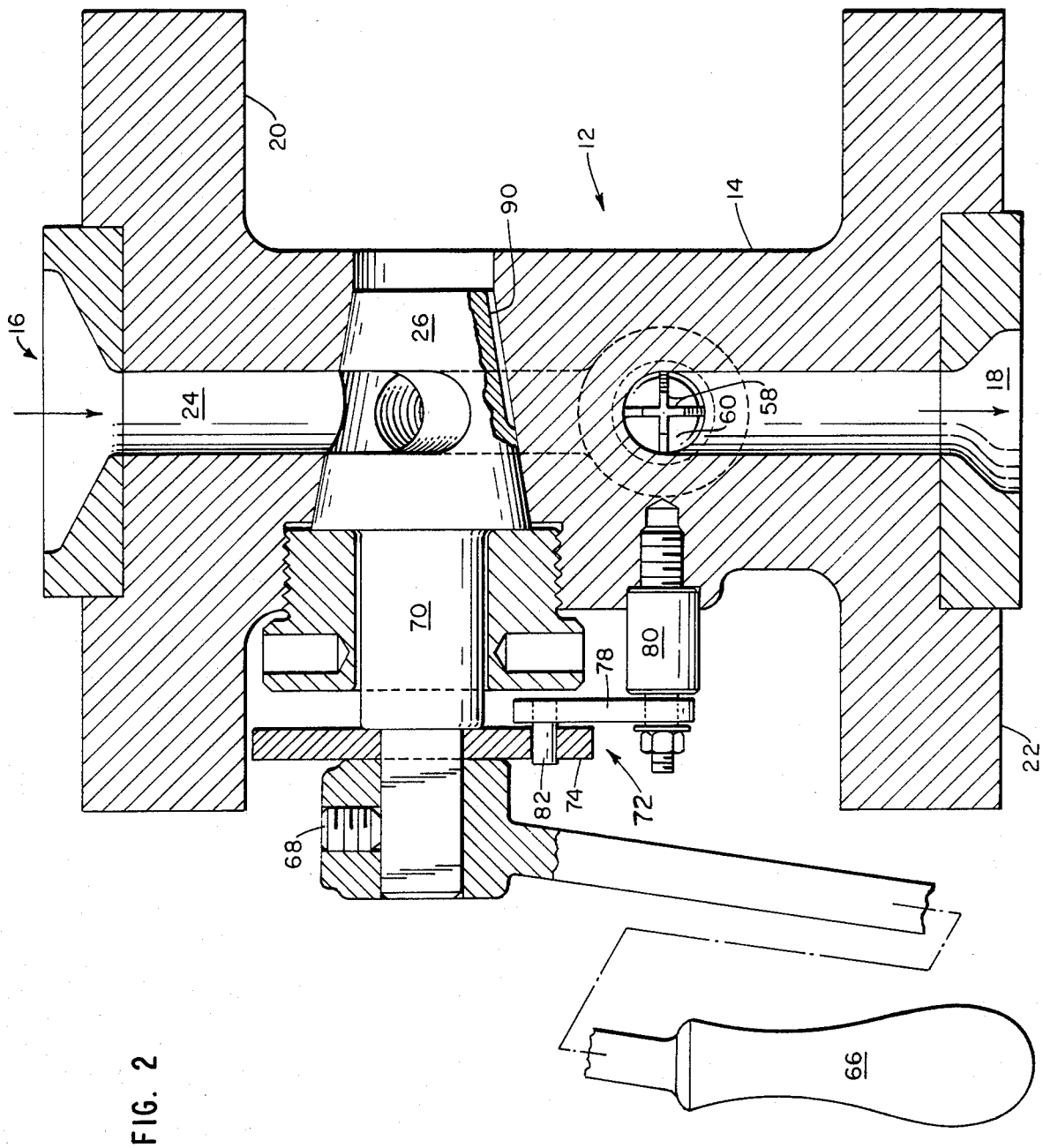
FIG. 2 is an elevation in section taken on line 2—2 of FIG. 1.

As shown in FIGS. 1 and 2, a slot 90 of uniform cross section extends longitudinally of the valve 26, terminating at its outer end. This slot is located so that, if the valve is rotated counterclockwise as viewed in FIG. 1 to a position in which it barely closes off the passage 30, the slot is in a position to communicate between the passage 30 and the exterior of the body 14. This communication continues as the valve rotates further to the limiting position illustrated in FIG. 4. Thus, while the passage 30 is closed off it is being vented to the exterior of the body 14, thereby relieving the pressure therein. Since the filter 2 is still on-stream and since the valve is connected to a die, the passage 64 is pressurized, and the pressure differential across the ball check valve 60 causes it to close. The filter 1 may be removed and replaced. When this filter is replaced, the vent valve 54 is rotated sufficiently to cause communication between the interior of the tube 44 and the exterior of the valve through the hole 56. The valve 26 is then rotated clockwise toward the position shown in FIG. 1. In the initial portion of this rotation, the valve member reaches a position exposing a small clearance area 92 formed in the body 14, whereby polymer begins to flow into the passage 30. This flow begins to fill the passage 30 and the chamber 34, expelling air therefrom through the hole 56 to the exterior of the assembly. This process continues until all of the air has been expelled from these spaces, at which time the vent valve 54 is closed. The movement of the valve member continues until it reaches the position shown in FIG. 1, by which time the system pressure will have become sufficient to unseat the ball check valve 60 and to permit polymer flow to resume through the filter 1.

It will be noted that the changing of the filters can be accomplished by the rotation of a single valve member 26, in contrast to systems that require multiple valve elements. However, it is not necessary that a plug valve be used. For example, the valve may be a cylindrical valve, and it may have either a rotary or a slide action. Sliding valves of other than circular cross section may also be employed. In any case, there is a separate check valve for each of the filters.

The valve 26 or a valve functioning in a similar manner can be operated normally to close off either of the filter passages 28 or 30 when the other passage is on-stream. In that case, the system would operate with only a single filter on-stream at any time. However, in many applications bi-flow operation is preferred, and in particular it is desirable to change the filters in alternate sequence, that is, in a staggered manner as shown by the following considerations.

As an approximation, laminar Newtonian flow is assumed, and it is also assumed that the flow restrictions upstream and downstream of the filters are negligible and that the flow rate "Q" through both filters is constant. The pressure drop "p" across the filters at any given time is expressed as follows:

$$p = \frac{CQ}{a} = \frac{Cq_1}{a_1} = \frac{Cq_2}{a_2} \tag{1}$$

where "C" is a constant, "$a_1$" and "$a_2$" are the open areas of the respective filters, "a" is the sum of "$a_1$" and "$a_2$" and "$q_1$" and "$q_2$" are the respective flow rates through the filters, all at the given time. From equation (1), $$aq_1 = a_1 Q, \text{ and } aq_2 = a_2 Q \tag{2}$$

Contaminants are assumed to be uniformly dispersed in the flowing polymer, and a filter therefore blocks at a rate, defined in units of area per unit of time "t," which is proportional to the volume flow rate through it. Thus, $$\frac{da}{dt} = -kQ; \frac{da_1}{dt} = -kq_1; \frac{da_2}{dt} = -kq_2 \tag{3}$$

where "k" is a contamination constant defined in units of area blocked per unit volume of flowing polymer.

Differentiating one of equations (2) with respect to time, $$a\frac{dq_1}{dt} + q_1\frac{da}{dt} = Q\frac{da_1}{dt} \tag{4}$$

Substituting from equations (3) into equation (4), $$a\frac{dq_1}{dt} - kQq_1 = -kQq_1, \text{ and } \frac{dq_1}{dt} = 0 \tag{5}$$

Thus $q_1$ is a constant and by a like derivation $q_2$ is also a constant. It follows by equation (1) that $a_1/a_2$ is also a constant.

Let "A" be the open area of a clean filter and "Ax" be the open area of a filter at the time it is changed; that is, "x" equals the ratio of the open area of a filter when it is changed to the clean area "A". Then, if $a_1$ and $a_2$ are the respective open areas at the start of a cycle just after filter 1 has been changed and $a_1'$ and $a_2'$ are the respective open areas at the end of the cycle just before filter 2 is changed, we have the expressions $$\frac{a_1}{a_2} = \text{constant} = \frac{a_1'}{a_2'}, \text{ and } \frac{A}{a_2} = \frac{a_2}{Ax}, \tag{6}$$

which results from the fact that in order for the cycles to be repetitive, the value $a_1'$ must equal the value $a_2$. From equation (6) there is derived $$a_2 = Ax^{\frac{1}{2}} \tag{7}$$

Thus at the time of changing filter 1, filter 2 will have an open area that is a function of "x." The value of "x," that is, the fraction of the area A that is still open when each filter is changed, is a matter of choice, and affects the magnitude of "p" at different times during the cycle, the magnitudes of the abrupt changes in "p" that occur when each filter is changed, and the duration of time that each filter is kept on-stream.

Considering first the effect on "p," at the start of a cycle when filter 1 is clean, from equation (1)

$$p_1 = \frac{CQ}{A + Ax^{\frac{1}{2}}} = \frac{CQ}{A(1 + x^{\frac{1}{2}})} \tag{8}$$

Just before filter 2 is changed, $$p_2 = \frac{CQ}{Ax^{\frac{1}{2}} + Ax} = \frac{CQ}{A(x^{\frac{1}{2}} + x)} \tag{9}$$

Just after the valve operates to close off filter 2, $$p_3 = \frac{CQ}{Ax^{\frac{1}{2}}} \tag{10}$$

Just after a clean filter 2 comes on-stream.

$$p_4 = p_1 = \frac{CQ}{Ax^{\frac{1}{2}} + A} = \frac{CQ}{A(1 + x^{\frac{1}{2}})} \tag{11}$$

From these equations it is demonstrated that $p_1 = p_3 - p_2$, that is, the abrupt pressure change that occurs when the valve operates to close off a plugged filter equals the pressure drop at the start of a cycle just after a clean filter has been put on-stream. Likewise, $-p_2 = p_4 - p_3$, that is, the abrupt pressure change that occurs when a clean filter is put on-stream equals the pressure drop that exists just before a blocked filter is closed off for changing. These relationships are shown as functions of "x" in FIG. 6, in which the ordinates represent the scaler values of the variable terms in equations (8) to (11). Curve (A) represents the values of the variable terms in $p_1$, $p_4$ and $(p_3-p_2)$. Curve (B) represents the values of the variable terms in $p_2$ and $(p_4-p_3)$. Curve (C) represents the values of the variable term in $p_3$. Curve (D) represents the values of the variable term in $(p_2-p_1)$. It is significant that the largest pressure drops, represented by curve (C), are reached just after a plugged filter is closed off, and the largest abrupt pressure changes, represented by curve (B), occur when a clean filter is put on-stream, for all possible values of "x."

Since CQ/A is a constant, it is apparent that as "x" becomes larger, approaching "1," the pressure drop "p" becomes smaller at each time during a cycle. For example, if "x" is $\frac{1}{4}$, "C" is 9.6, "Q" is 1000 and "A" is 16 in appropriate units, CQ/A equals 600 and

| | | |
|---|---|---|
| $p_1 = 400$ | | |
| $p_2 = 800$; | $p_2 - p_1 = 400$ | (12) |
| $p_3 = 1200$; | $p_3 - p_2 = 400$ | |
| $p_4 = 400$; | $p_4 - p_3 = -800$ | |

If x = 1/16,

| | | |
|---|---|---|
| $p_1 = 480$; | | |
| $p_2 = 1920$; | $p_2 - p_1 = 1440$ | (13) |
| $p_3 = 2400$; | $p_3 - p_2 = 480$ | |
| $p_4 = 480$, | $p_4 - p_3 = -1920$ | |

The foregoing examples also illustrate that as "x" becomes larger, the abrupt pressure changes that occur during the steps of replacing each filter become smaller. The pressure drops and abrupt pressure changes cannot be reduced to zero but approach limiting values. These values are represented by the theoretical case of x=1, wherein both filters would be simultaneously clean to produce the lowest possible pressure drop "p" and one of the filters would be immediately closed off for a change, thereby causing an abrupt pressure change equal to this lowest value. In practice, of course, there is a compromise in which a value of "x" less than "1" is selected to allow each filter to be blocked to an extent that causes larger pressure drops and abrupt pressure changes, the values of which are within chosen maximum tolerances.

As stated above, the value of "x" varies the time each filter is kept on-stream. If "T" is defined as the cycle time in hours between the change of one filter and the change of the other filter, each filter is on-stream for a time equal to "2T". In two cycles beginning just after filter 1 is changed, the area of filter 1 that would be blocked equals $k(q_1+q_2)T$, "$q_1$" and "$q_2$" being constant. By the previous assumption, this area also equals $A-Ax$. An equal area $k(q_2+q_1)T$ of filter 2 would be blocked in the same two cycles, notwithstanding that the two filters are changed at the ends of different cycles. Thus the total area blocked in both filters in the time interval 2T would be $$2(A-Ax)=2k(q_1+q_2)T, \quad (14)$$

which reduces to $$T = \frac{A(1-x)}{kQ}. \quad (15)$$

For example, assuming the previous values of "A" and "Q", if "k" is 0.001 in appropriate units, the case of $x=\frac{1}{4}$ (the filters being changed when 75% blocked) gives a cycle duration "T" of 12 hours. Similarly, the case of $x=1/16$ (the filters being changed when 93.75% blocked) gives a cycle duration "T" of 15 hours.

From the foregoing it is evident that if "x" is increased, thereby reducing the percentage of each filter that is blocked at the time of change in order to reduce the pressure drops "p" and the abrupt changes in pressure that occur at the changing of the filters, as shown by equations (8) to (11), there is a decrease in the cycle time T as shown by equation (15). Conversely, if "x" is described, thereby increasing the pressure drops "p" and the abrupt changes in pressure that occur at the changing of the filters, the cycle time T is increased and the filters are more completely blocked before they are changed.

In most applications it is desirable to operate at the lowest value of "x," and thus the lowest frequency of filter changes, which are consistent with predetermined limiting values of pressure drop and sudden pressure changes. This will in turn determine the value of "T". By inspection of FIG. 6 it can be seen that for values of "x" above about 0.4 the effect of a given increment of change in "x" on the magnitude of the pressure drop and the sudden pressure changes is relatively small. However, for values of "x" below about 0.1 the corresponding effect of an equal increment of change in "x" is relatively very much greater. Thus for any chosen value of "x" below about 0.1, an inadvertent delay past the appropriate time for changing a filter may lead to an undesirably large change in the magnitudes of the pressure drop and sudden pressure changes. For this reason it has been found that optimum performance frequently occurs when "x" has a chosen value between about 0.1 to 0.3.

In practice, various iterative procedures may be followed in arriving at a desired alternate sequence of filter changes. Commonly, such procedures are initiated with both filters clean. An alternate sequence of changing may be initiated either by starting with only one filter on-line, then putting the other filter on-line after an initial time interval; or alternatively by starting with both filters on-line, with only one being changed after an initial time interval. The initial time interval preferably depends on the rate of buildup in the pressure drop during operation and the permissible limiting value thereof. The filters may thereafter be changed in alternate sequence at a variable rate approaching that which produces the most satisfactory operation in terms of pressure drops and sudden pressure changes resulting from the changing of the filters. In any of these procedures the starting rate of filter changes is generally sufficiently great to cause the filters being changed to be less blocked than in the ultimate condition when the rate of filter changes will have become constant.

I claim:

1. In a polymer filtration system comprising a body having means defining an inlet, means defining an outlet, means defining first and second channels each connecting the inlet and outlet, a replaceable filter in each channel, and a rotatable valve member formed to connect the inlet and outlet, in a first position of the valve member through the first channel only, and in a second position of the valve member through the second channel only, the valve member being formed to connect the inlet and outlet through both channels in a third position of the valve member intermediate between said first and second positions, escapement means to limit movements of the valve member comprising a cam plate rotatable with the valve member and having surface contours formed thereon, and a link pivoted on the body and having a portion slidably engaging said contours, said contours including a pair of detents formed therein to cause the movement of the valve member from the third position to the first and second positions to be limited to an alternate sequence.

2. The combination of claim 1, with a check valve located in each channel between a filter and the outlet.

* * * * *